United States Patent
Lee et al.

(10) Patent No.: US 11,584,194 B2
(45) Date of Patent: Feb. 21, 2023

(54) ELECTRODE CARRIER OF HEATING DEVICE ADOPTING CNT COMPOSITE MATERIAL

(71) Applicants: HYUNDAI MOTOR COMPANY, Seoul (KR); KIA MOTORS CORPORATION, Seoul (KR); Duck Yang Industry Co., Ltd., Ulsan (KR)

(72) Inventors: Jae-Seung Lee, Hwaseong-si (KR); Kwang-Seub Kim, Daejeon (KR)

(73) Assignees: HYUNDAI MOTOR COMPANY, Seoul (KR); KIA MOTORS CORPORATION, Seoul (KR); DUCK YANG INDUSTRY CO., LTD., Ulsan (KR)

( * ) Notice: Subject to any disclaimer, the term of this patent is extended or adjusted under 35 U.S.C. 154(b) by 385 days.

(21) Appl. No.: 16/838,611

(22) Filed: Apr. 2, 2020

(65) Prior Publication Data

US 2021/0206233 A1 Jul. 8, 2021

(30) Foreign Application Priority Data

Jan. 3, 2020 (KR) ........................ 10-2020-0000728

(51) Int. Cl.
*B60H 1/22* (2006.01)
*H05B 3/14* (2006.01)

(52) U.S. Cl.
CPC ........... *B60H 1/2215* (2013.01); *H05B 3/145* (2013.01); *B60H 2001/2268* (2013.01)

(58) Field of Classification Search
CPC ................ B60H 1/2215; B60H 1/2227; B60H 2001/2268; H05B 3/145
See application file for complete search history.

(56) References Cited

U.S. PATENT DOCUMENTS

2004/0252986 A1* 12/2004 Ito .......................... F24H 3/0429
  392/485
2017/0217284 A1* 8/2017 Ji ........................ B60H 1/00978

FOREIGN PATENT DOCUMENTS

KR  10-2018-0129092 A  12/2018

* cited by examiner

*Primary Examiner* — Dana Ross
*Assistant Examiner* — Joe E Mills, Jr.
(74) *Attorney, Agent, or Firm* — Morgan, Lewis & Bockius LLP

(57) ABSTRACT

An electrode carrier of a vehicle heating device applying a CNT composite material includes a first electrode part and a second electrode part having different polarities from each other and formed in a straight line along a length direction of a vehicle; a fixing member configured to fix the first electrode part and the second electrode part to the vehicle; and the CNT composite material formed between the first electrode part and the second electrode part, configured to generate heat when being electrified, and fixed to the vehicle.

15 Claims, 7 Drawing Sheets

ELECTRODE CARRIER OF HEATING DEVICE ADOPTING CNT COMPOSITE MATERIAL

CROSS-REFERENCE(S) TO RELATED APPLICATION(S)

This application claims priority to Korean Patent Application No. 10-2020-0000728, filed on Jan. 3, 2020, the disclosure of which is incorporated herein by reference in its entirety.

BACKGROUND

Field of the Disclosure

Exemplary embodiments of the present disclosure relate to an electrode carrier of a heating device adopting a carbon nanotube (CNT) composite material thereto, and more particularly, to an electrode carrier of a heating device to which a CNT composite material is applied for a surface heating element using the CNT composite material that is applied to an armrest of a vehicle.

Description of the Related Art

A vehicle is provided with various devices for a passenger's comfortable riding on the vehicle.

Among them, an air conditioning device has a temperature adjustment function within the vehicle to help passenger's comfortable movement.

In particular, a heating device is a very important part.

For example, in winter, a handle having a heating line may be provided to prevent the handle from being cold, or a heating line may be provided in a seat to prevent the seat from being cold.

However, the handle or the seat is a portion of the vehicle which most frequently comes in contact with body regions of a vehicle passenger, and thus addition of the heating line as the heating device is a common technology.

However, there are vehicles in which the heating lines are provided even at portions which can come in contact with the body regions of the passenger in addition to the handle or the seat.

For example, in some luxury cars, the heating line may be additionally provided on a door handle or an armrest.

Such an armrest heating device enables the passenger to enjoy more comfortable driving by preventing the passenger from feeling cold when the arm region of the passenger comes in contact with interior materials inside the vehicle.

However, the above-described heating lines for the vehicles in the related art have the problem with low thermal efficiency.

In other words, the heating using the heating lines has the problem in that the thermal efficiency is lowered due to a small heating area against an area being applied.

Further, the system using the heating lines in the related art has limitations in that a manufacturing process for including the heating lines is added and the application range thereof is restricted.

That is, in the related art, it is required to position electrodes on a mold when a heating element insert is manufactured.

Accordingly, after the insert is manufactured, electrode parts are exposed unnecessarily excessively, which causes the danger of the electric defect occurrence and the damage to the electrode parts.

Further, according to the heating element structure in the related art, stiffness deterioration in an armrest core part occurs due to the load being applied onto the armrest core part, which causes the deformation in or damage to an armrest heating part and other troubles.

The foregoing description of the background technology is intended merely to help the understanding of the background of the present disclosure, and is not intended to mean that the present disclosure falls within the purview of the related art that is already known to those of ordinary skill in the art.

SUMMARY

The present disclosure is to overcome the above problems, and at least one of the object of the present disclosure is to provide an electrode carrier for stably and effectively fixing electrodes applied to a surface heating element using a CNT composite material being applied to an armrest, and to provide an armrest electrode carrier which further facilitates position fixing during the final insert injection through the primary position fixing using the electrode carrier provided as above, minimizes the number of support pinholes, and prevents the electrodes from being exposed to outside.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

According to the present disclosure to solve the above-described problems in the related art, an electrode carrier of a vehicle heating device applying a CNT composite material includes: a first electrode part 201 and a second electrode part 202 having different polarities from each other and formed in a straight line along a length direction of a vehicle; a fixing member 110 configured to fix the first electrode part 201 and the second electrode part 202 to the vehicle; and the CNT composite material formed between the first electrode part 201 and the second electrode part 202, configured to generate heat when being electrified, and fixed to the vehicle.

The fixing member 110 is configured to fix the first electrode part 201 and the second electrode part 202 to an armrest core part 401 of the vehicle.

The fixing member 110 is configured to fix the first electrode part 201 and the second electrode part 202 to be in parallel to each other and to be spaced apart from each other at a specific distance.

The fixing member 110 includes: a plurality of lateral fixing members directed toward an indoor direction of the vehicle and configured to support the first electrode part 201 and the second electrode part 202 in a shortest distance between the first electrode part 201 and the second electrode part 202; and a longitudinal fixing member directed toward the length direction of the vehicle and configured to connect among the plurality of lateral fixing members.

The lateral fixing member includes: a first fixing member 111 configured to connect one end of the first electrode part 201 to one end of the second electrode part 202; a second fixing member 112 configured to connect the other end of the first electrode part 201 to the other end of the second electrode part 202; and a third fixing member 113 configured to connect a center of the first electrode part 201 to a center of the second electrode part 202.

The longitudinal fixing member includes at least one of a fourth fixing member 114 configured to connect between the first fixing member 111 and the third fixing member 113 and a fifth fixing member 115 configured to connect between the second fixing member 112 and the third fixing member 113.

The fourth fixing member 114 or the fifth fixing member 115 connects between center parts of the lateral fixing members.

The first fixing member 111, the fourth fixing member 114, and the third fixing member 113 are "H"-shaped.

The second fixing member 112, the fifth fixing member 115, and the third fixing member 113 are "H"-shaped.

The first electrode part 201 and the second electrode part 202 are fixed through the lateral fixing members.

End parts of the first electrode part 201 and the second electrode part 202 project by a specific length from the first fixing member 111.

The lateral fixing member includes an upper fixing part 120 formed to project upward from an upper surface of the lateral fixing member and fixed to the armrest core part 401.

A diameter of the upper fixing part 120 is increased toward the upper part of the upper fixing part 120.

The upper fixing part 120 is formed in the center of the upper surface of the lateral fixing member.

The lateral fixing member includes a lower fixing part 130 formed to project downward from a lower surface of the lateral fixing member and fixed to the armrest core part 401.

A diameter of the lower fixing part 130 is increased toward the lower part of the lower fixing part 130.

The lower fixing part 130 is formed in the center of the lower surface of the lateral fixing member.

According to the present disclosure configured as described above, the following effects can be obtained.

First, through the electrode carrier, the electrodes applied to the surface heating element using the CNT composite material can be fixed stably and effectively.

Second, through the primary position fixing using the electrode carrier, the position fixing can be further facilitated when the final insert is injected.

Third, by providing the electrode carrier, the number of support pinholes can be minimized, thereby reducing the number of processes and increasing the manufacturing efficiency.

Fourth, because the electrodes are prevented from being exposed to the outside, the electric defect can be originally blocked, and the damage to the electrode parts can be suppressed.

Fifth, because the surface heating element using the CNT composite material is applied, the passenger can be prevented from feeing a foreign body at the portion which comes in connect with the passenger's body.

Sixth, because the surface heating element using the CNT composite material is applied, the degree of freedom of design can be improved.

Seventh, because the surface heating element using the CNT composite material is applied, the heat generation efficiency against the area can be maximized.

Eighth, although the surface heating element using the CNT composite material is applied, the input amount of the CNT (carbon) can be minimized, and the heat generation can be maximized, thereby minimizing the cost increase to improve the productivity.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF SPECIFIC EMBODIMENTS

Figure 1:
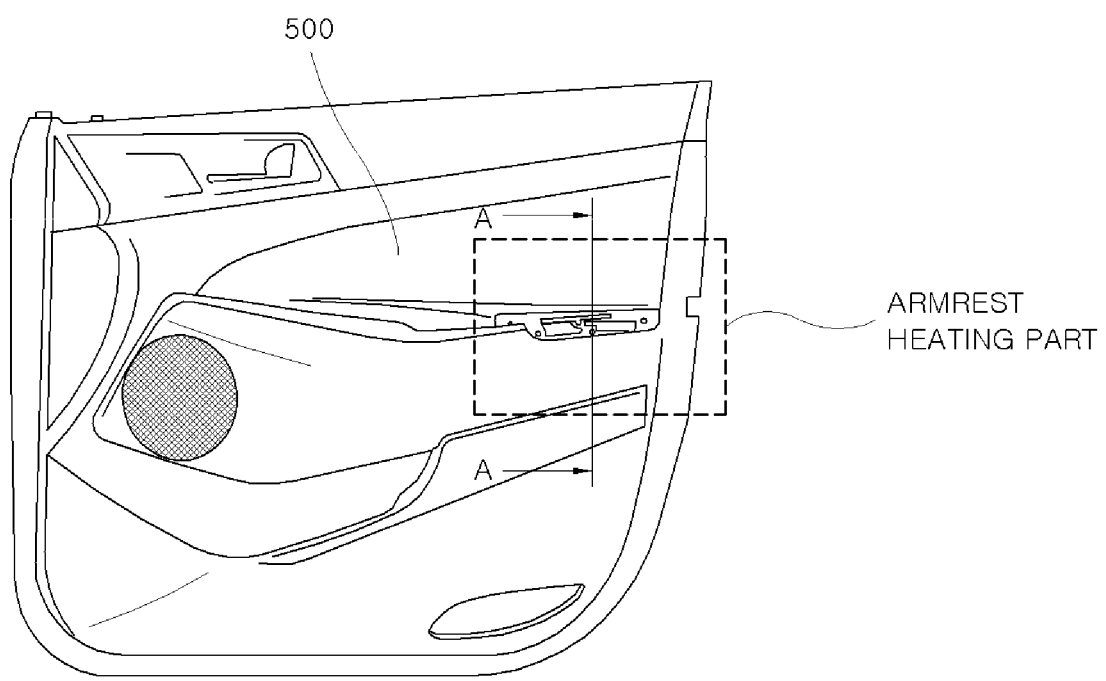
FIG. 1 is a view illustrating an armrest heating part according to a preferred embodiment of the present disclosure.
Figure 2:
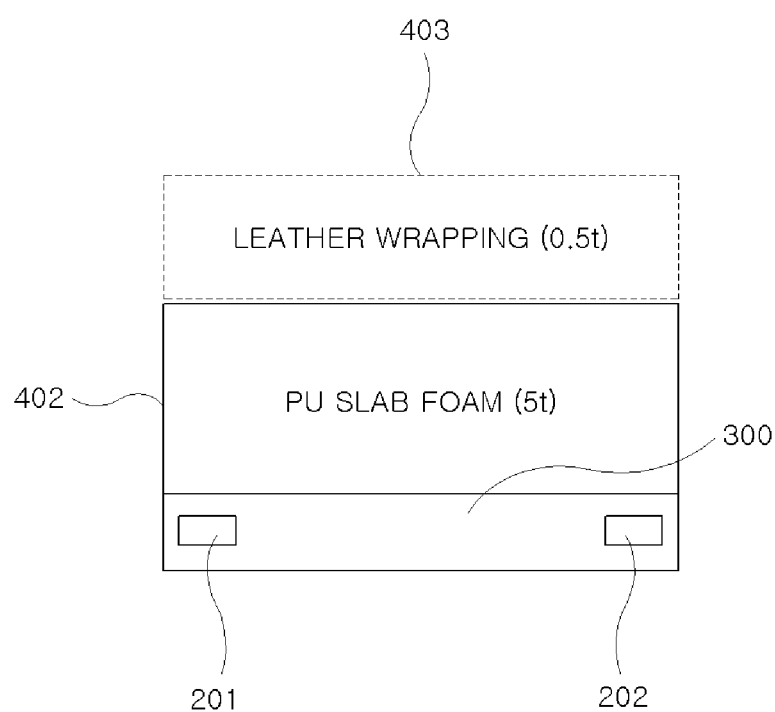
FIG. 2 is a cross-sectional view of the line A-A of FIG. 1 of the armrest heating part according to a preferred embodiment of the present disclosure.

Various exemplary embodiments of the present disclosure will be described in detail with reference to the accompanying drawings. However, it should be understood that the present disclosure is not limited to the specific embodiments described hereinafter, but includes various modifications, equivalents, and alternatives of the embodiments of the present disclosure.

In the explanation of respective drawings, similar reference numerals are used for similar constituent elements.

Although the terms "first, second, and so forth" are used to describe various constituent elements, such constituent elements should not be limited by the terms. The terms are used only to discriminate a constituent element from other constituent elements.

For example, without departing from the scope of the present disclosure, a first element may be called a second element, and the second element may also be called the first element in a similar manner. The term "and/or" may include all possible combinations of items that are enumerated together.

Unless differently defined, all terms used herein, including technical or scientific terms, have the same meanings as those that are generally understood by a person of ordinary skill in the art to which the present disclosure pertains.

It should be construed that the terms as defined in generally used dictionaries have meanings that coincide with the meanings in context of related technologies, and unless clearly defined in the description, the terms should not be construed as ideal or overly formal meanings.

An electrode carrier 100 according to a preferred embodiment of the present disclosure is applied to an armrest heating device of a vehicle.

The electrode carrier 100 may include electrode parts 200 and a fixing member 110.

More specifically, the electrode parts 200 have polarities different from each other, and are deployed in a length direction of the vehicle.

The fixing member 110 serves to fix the electrode parts 200 to the vehicle.

It may be preferable that the fixing member 110 fixes the electrode parts 200 to an armrest core part 401 of the vehicle.

Figure 3:
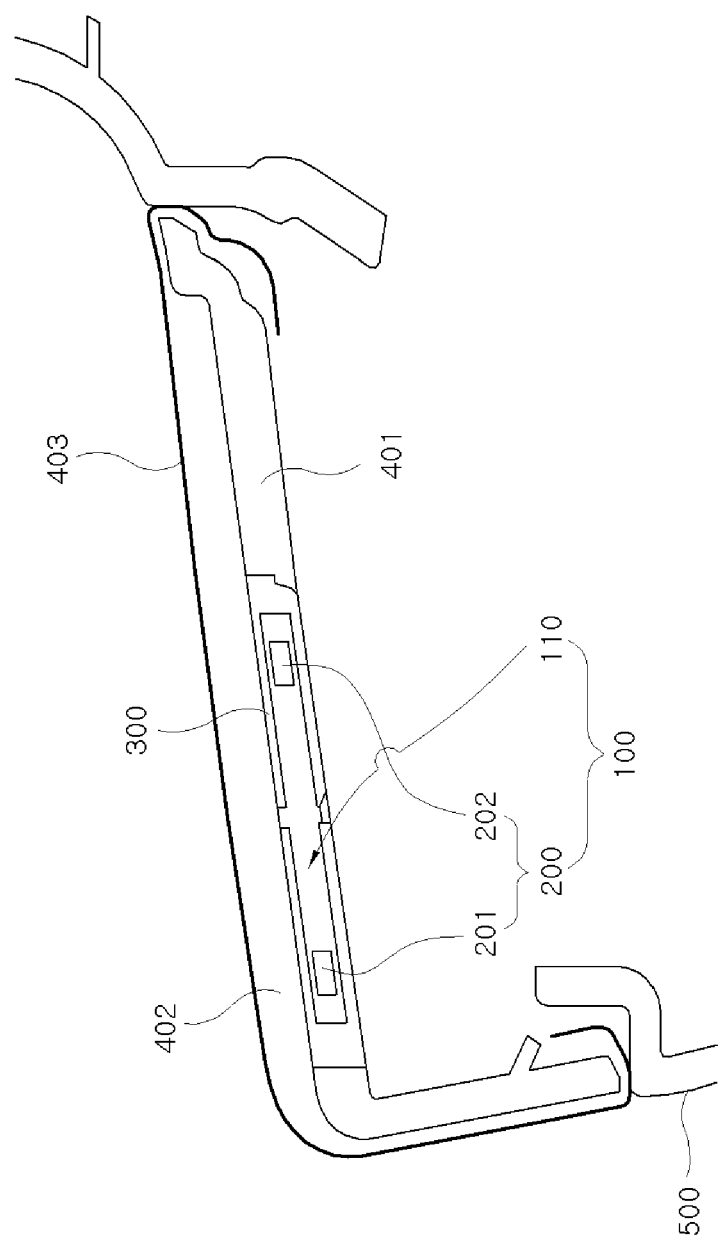
FIG. 3 is a cross-sectional view of a door trim on which an electrode carrier is installed according to a preferred embodiment of the present disclosure.
Figure 4:
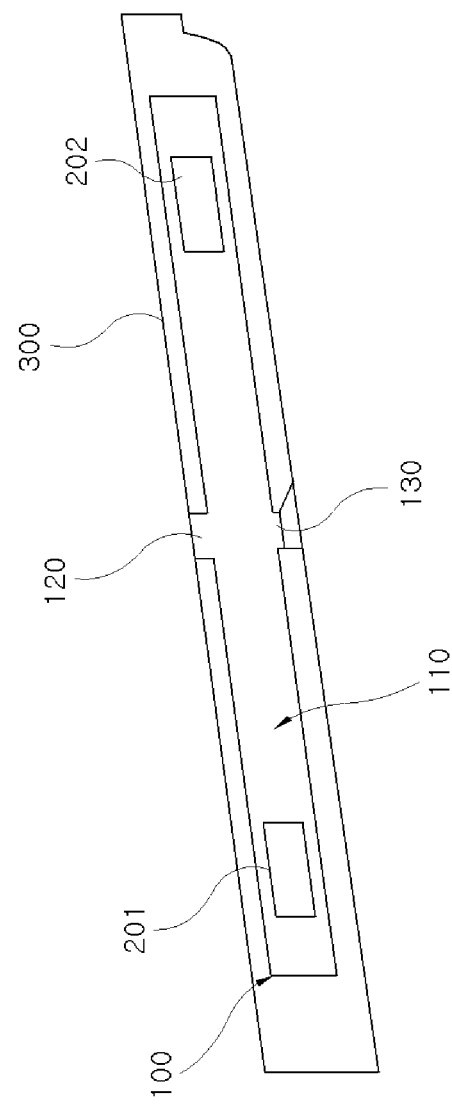
FIG. 4 is a cross-sectional view of the electrode carrier according to a preferred embodiment of the present disclosure.
Figure 5:
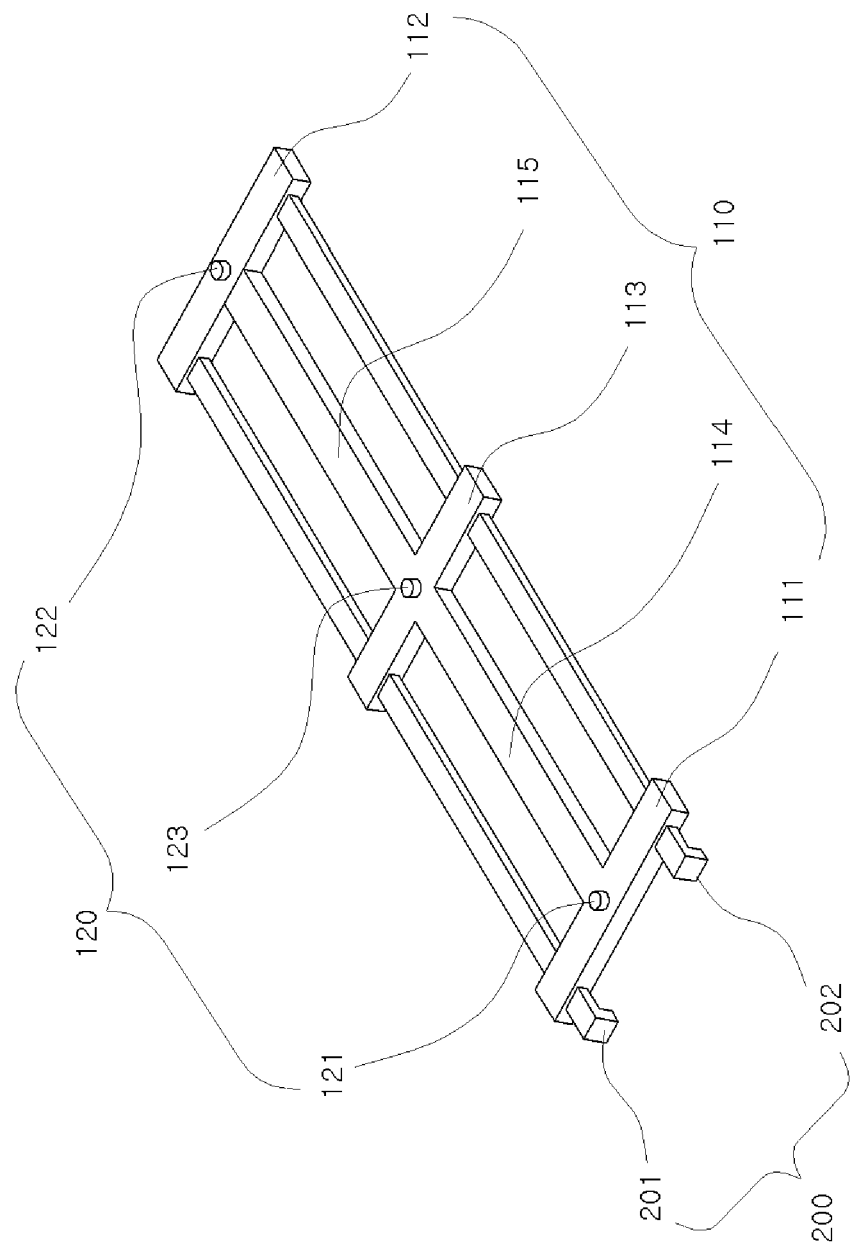
FIG. 5 is a perspective view of the electrode carrier 100 according to a preferred embodiment of the present disclosure.
Figure 6:
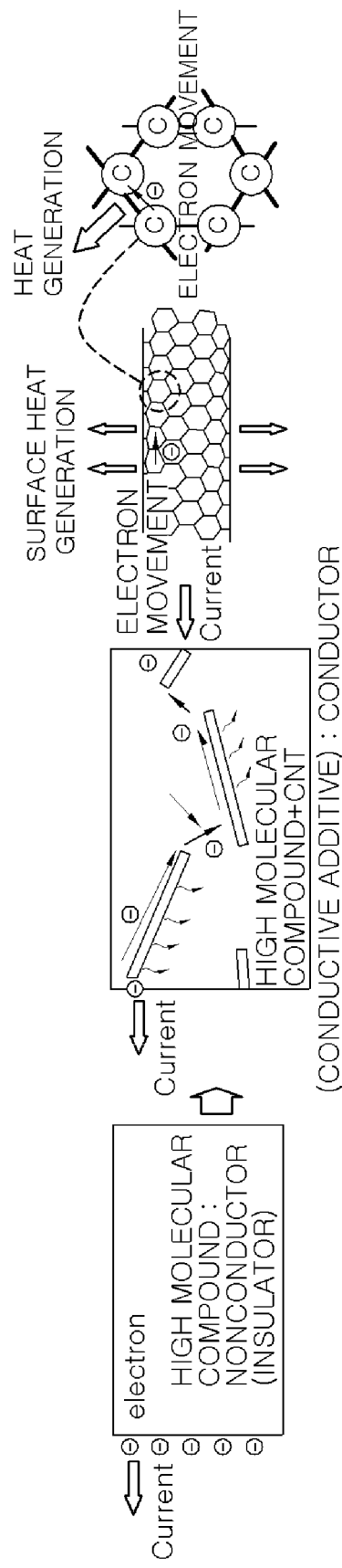
FIG. 6 is a schematic diagram explaining the heating principle of a CNT composite material (mixture) according to a preferred embodiment of the present disclosure.
Figure 7:
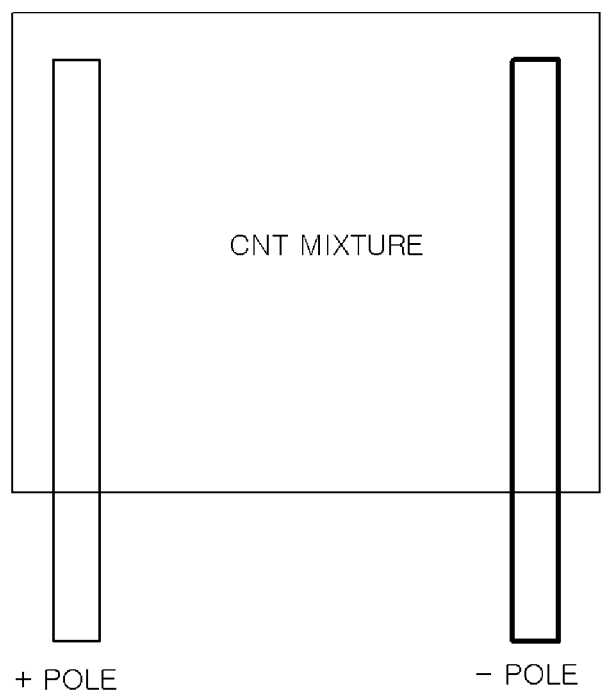
FIG. 7 is a diagram illustrating an electrode configuration of a CNT composite material (mixture) according to a preferred embodiment of the present disclosure.

More specifically, on a door trim 500 of the vehicle, the armrest core part 401, an armrest cushion part 402, and an armrest skin part 403 may be provided as illustrated in FIG. 3.

The electrode carrier 100 is fixed to the armrest core part 401.

The armrest core part 401 is provided below the armrest cushion part 402 on the door trim 500.

The armrest skin part 403 covers an upper portion of the armrest cushion part 402.

Meanwhile, a CNT composite material part 300 is formed to surround the electrode carrier 100.

It may be preferable that the electrode carrier 100 is provided on a position on which an arm of a passenger is put on the door trim 500.

In this case, it may be preferable that the thickness of the CNT composite material part 300 is 1.0 T, and the thickness of the armrest cushion part 402 is 5 T.

Further, it may be preferable that the armrest skin part 403 has a thickness of 0.5 T.

Meanwhile, it may be preferable that the thickness of each of the first electrode part 201 and the second electrode part 202 is 0.5 T.

The electrode parts 200 may include a first electrode part 201 and a second electrode part 202 formed in a straight line along a length direction of the vehicle.

It may be preferable that the fixing member 110 fixes the first electrode part 201 and the second electrode part 202 to be in parallel to each other and to be spaced apart from each other at a specific distance.

More specifically, the fixing member 110 may include a plurality of lateral fixing members directed toward an indoor direction of the vehicle and configured to support the first electrode part 201 and the second electrode part 202 in the shortest distance between the first electrode part 201 and the second electrode part 202.

Further, it may be preferable that the fixing member 110 may include a longitudinal fixing member directed toward the length direction of the vehicle and configured to connect among the plurality of lateral fixing members.

Here, it may be understood that the term "longitudinal" indicates the length direction of the vehicle, and the term "lateral" indicates the indoor direction that is vertical to the length direction of the vehicle.

In this case, the lateral fixing members may include a first fixing member 111, a second fixing member 112, and a third fixing member 113.

More specifically, the first fixing member 111 may connect one end of the first electrode part 201 to one end of the second electrode part 202.

The second fixing member 112 may connect the other end of the first electrode part 201 to the other end of the second electrode part 202.

The third fixing member 113 may connect a center of the first electrode part 201 to a center of the second electrode part 202.

Further, the longitudinal fixing member may include at least one of a fourth fixing member 114 and a fifth fixing member 115.

In other words, it may be preferable that the longitudinal fixing member includes at least one of the fourth fixing member 114 configured to connect between the first fixing member 111 and the third fixing member 113 and the fifth fixing member 115 configured to connect between the second fixing member 112 and the third fixing member 113.

In this case, the fourth fixing member 114 or the fifth fixing member 115 may connect between the center parts of the lateral fixing members.

Meanwhile, it may be preferable that the first fixing member 111, the fourth fixing member 114, and the third fixing member 113 are "H"-shaped as a whole.

Further, it may be preferable that the second fixing member 112, the fifth fixing member 115, and the third fixing member 113 are "H"-shaped as a whole.

Meanwhile, it may be preferable that the electrode parts 200 are fixed through the lateral fixing members.

It may be preferable that end parts of the electrode parts 200 project by a specific length from the first fixing member 111.

The end parts of the electrode parts 200 project by the specific length from the first fixing member 111 and thus may be easily connected to a power supply part (not illustrated).

However, because the end parts of the electrode parts 200 do not excessively project from the first fixing member 111, the damage to the electrode parts can be suppressed.

Meanwhile, it may be preferable that the lateral fixing member includes an upper fixing part 120 formed to project upward from an upper surface of the lateral fixing member and fixed to the armrest core part 401.

In one of the embodiments, it may be preferable that the upper fixing part 120 has a conical shape, and a diameter of the upper fixing part 120 is increased toward the upper part of the upper fixing part 120.

Accordingly, the upper fixing part 120 can be suppressed from descending due to the gravity when the upper fixing part 120 is fixed to the armrest core part 401, and thus the stiffness and durability can be secured.

Further, it may be preferable that the upper fixing part 120 is formed in the center of the upper surface of the lateral fixing member.

Meanwhile, it may be preferable that the lateral fixing member includes a lower fixing part 130 formed to project downward from a lower surface of the lateral fixing member and fixed to the armrest core part 401.

Further, in one of the embodiments, the lower fixing part 130 has a conical shape, and it may be preferable that a diameter of the lower fixing part 130 is increased toward the lower part of the lower fixing part 130.

Accordingly, a fine displacement of the upper fixing part 120 in an upward direction can be suppressed when the upper fixing part 120 is fixed to the armrest core part 401, and thus the stiffness and durability can be secured.

Meanwhile, it may be preferable that the lower fixing part 130 is formed in the center of the lower surface of the lateral fixing member.

In one of the embodiments, it may be preferable that the thickness of the upper fixing part 120 is greater than that of the lower fixing part 130.

This is because the fine displacement amount of the electrode carrier 100 in a downward direction by the gravity may be larger than the fine displacement amount of the electrode carrier 100 in an upward direction by the gravity, and by forming the thickness of the upper fixing part 120 to be greater than that of the lower fixing part 130, it is possible to minimize the movement due to the difference between the fine displacement amounts.

Meanwhile, the distance between the first fixing member 111 and the third fixing member 113 may be equal to the distance between the third fixing member 113 and the second fixing member 112.

In other words, the fourth fixing member 114 and the fifth fixing member 115 may have the same length.

Further, the first fixing member 111, the second fixing member 112, and the third fixing member 113 may be formed to have the same shape.

Meanwhile, it may be preferable that the electrode carrier 100 according to a preferred embodiment of the present disclosure is formed of a thermoplastic material.

Further, the CNT composite material may be formed to surround the fixing member 110 and to have a surface area, and enables the electrode parts 200 to uniformly generate heat when being electrified.

The CNT composite material is a component made of CNT mixtures, provided with the electrodes, and configured to self-generate heat when being electrified.

The CNT composite material generates heat when being electrified through the electrode parts, and the principle thereof is as follows.

A CNT heating element is obtained through combination of the CNT, which is a conductive additive, and a high molecular compound, and has the property of a conductor.

According to the principle, if electricity is applied to the CNT heating element, heat is generated in the process of electron movements.

While the present disclosure has been described with reference to the exemplified drawings, it will be apparent to those of ordinary skill in the art that the present disclosure is not limited to the described embodiments, and various changes and modifications may be made without departing from the spirit and scope of the present disclosure. Accordingly, such changes and modifications should belong to the claims of the present disclosure, and the right of the present disclosure should be construed based on the appended claims.

What is claimed is:

1. An electrode carrier of a vehicle heating device, comprising:
    a first electrode part and a second electrode part having different polarities from each other and formed in a straight line along a length direction of a vehicle;
    a fixing member configured to fix the first electrode part and the second electrode part to the vehicle; and
    a carbon nanotube (CNT) composite material encasing the first electrode part, the second electrode part, and the fixing member, configured to generate heat when being electrified, and fixed to the vehicle
    wherein the fixing member comprises:
        a plurality of lateral fixing members directed toward an indoor direction of the vehicle and configured to support the first electrode part and the second electrode part; and
        a longitudinal fixing member directed toward the length direction of the vehicle and configured to connect among the plurality of lateral fixing members.

2. The electrode carrier of claim 1, wherein the fixing member is configured to fix the first electrode part and the second electrode part to an armrest core part of the vehicle.

3. The electrode carrier of claim 2, wherein the fixing member is configured to fix the first electrode part and the second electrode part to be in parallel to each other and to be spaced apart from each other at a specific distance.

4. The electrode carrier of claim 3, wherein the plurality of lateral fixing members is configured to support the first electrode part and the second electrode part in a shortest distance between the first electrode part and the second electrode part.

5. The electrode carrier of claim 4, wherein the lateral fixing member comprises:
    a first fixing member configured to connect one end of the first electrode part to one end of the second electrode part;
    a second fixing member configured to connect the other end of the first electrode part to the other end of the second electrode part; and
    a third fixing member configured to connect a center of the first electrode part to a center of the second electrode part.

6. The electrode carrier of claim 5, wherein the longitudinal fixing member comprises at least one of a fourth fixing member configured to connect between the first fixing member and the third fixing member and a fifth fixing member configured to connect between the second fixing member and the third fixing member.

7. The electrode carrier of claim 6, wherein the fourth fixing member or the fifth fixing member connects between center parts of the lateral fixing members.

8. The electrode carrier of claim 6, wherein the first fixing member, the fourth fixing member, and the third fixing member are "H"-shaped.

9. The electrode carrier of claim 6, wherein the second fixing member, the fifth fixing member, and the third fixing member are "H"-shaped.

10. The electrode carrier of claim 6, wherein the first electrode part and the second electrode part are fixed through the lateral fixing members.

11. The electrode carrier of claim 10, wherein end parts of the first electrode part and the second electrode part project by a specific length from the first fixing member.

12. The electrode carrier of claim 5, wherein the lateral fixing member comprises an upper fixing part having a shape projected upward from an upper surface of the lateral fixing member in a center of the upper surface of the lateral fixing member and fixed to the armrest core part.

13. The electrode carrier of claim 12, wherein the upper fixing part has a conical shape, and a diameter of the conical shape of the upper fixing part increases in a direction toward the upper part of the upper fixing part.

14. The electrode carrier of claim 12, wherein the lateral fixing member comprises a lower fixing part having a shape projected downward from a lower surface of the lateral fixing member in a center of the lower surface of the lateral fixing member and fixed to the armrest core part.

15. The electrode carrier of claim 14, wherein the lower fixing part has a conical shape, and a diameter of the conical shape of the lower fixing part increases in a direction toward the lower part of the lower fixing part.

* * * * *